May 12, 1970
R. SASSENBERG
3,510,901
LIQUID TREATING MEANS FOR IMAGE CARRYING
FILM ON PROJECTION APPARATUS
Filed May 28, 1968
3 Sheets-Sheet 1
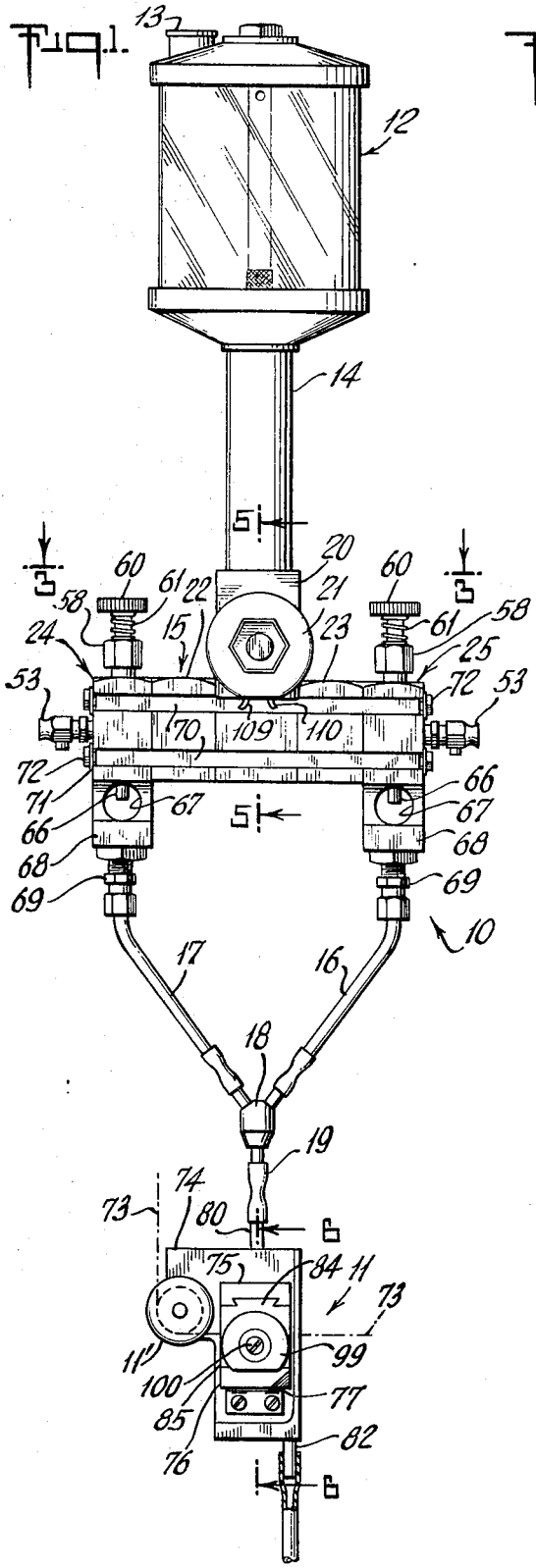
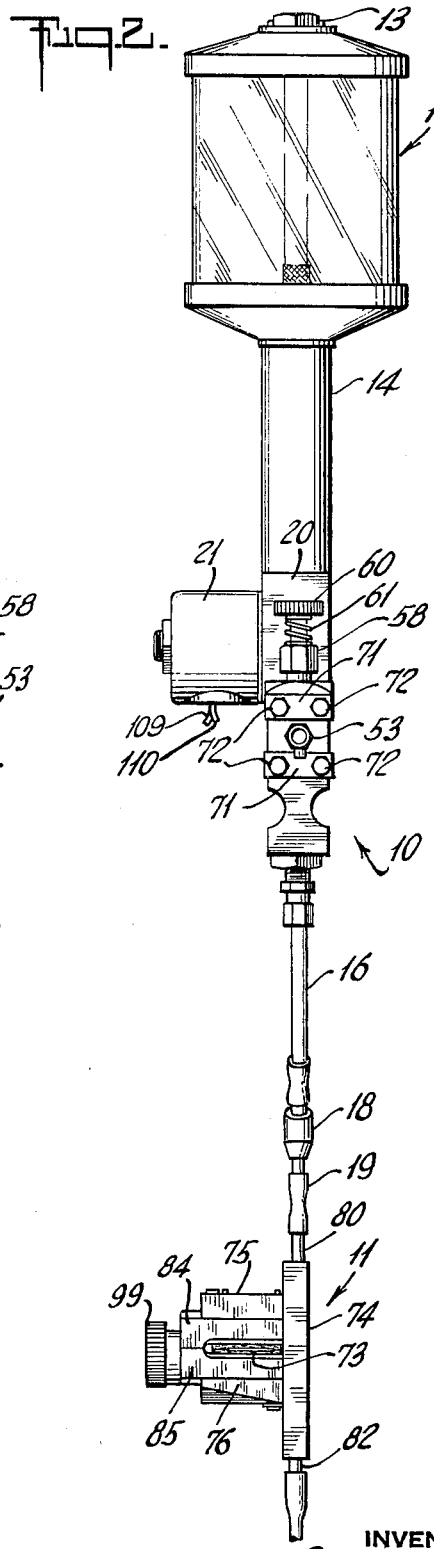
INVENTOR
RICHARD SASSENBERG
BY
ATTORNEY

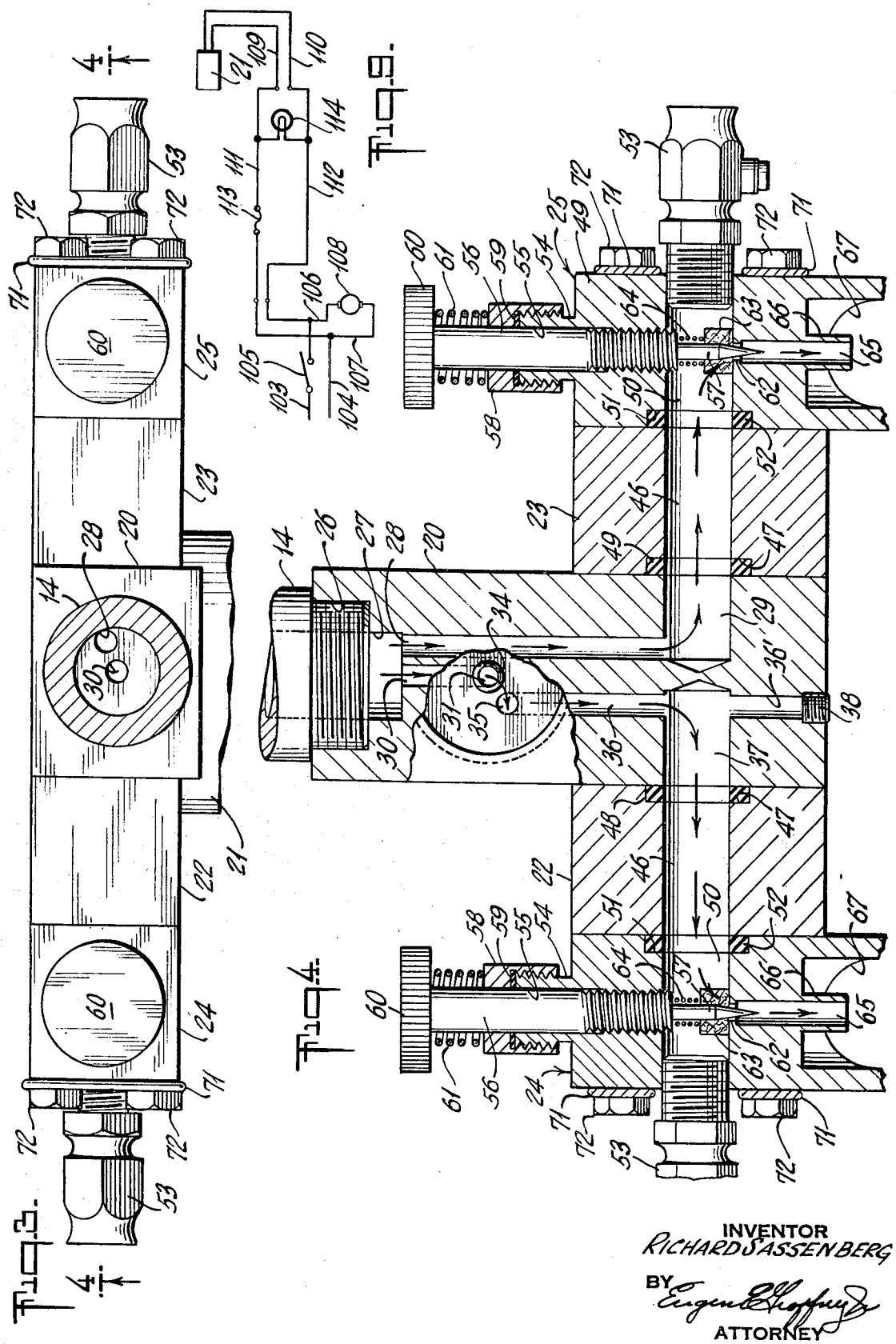

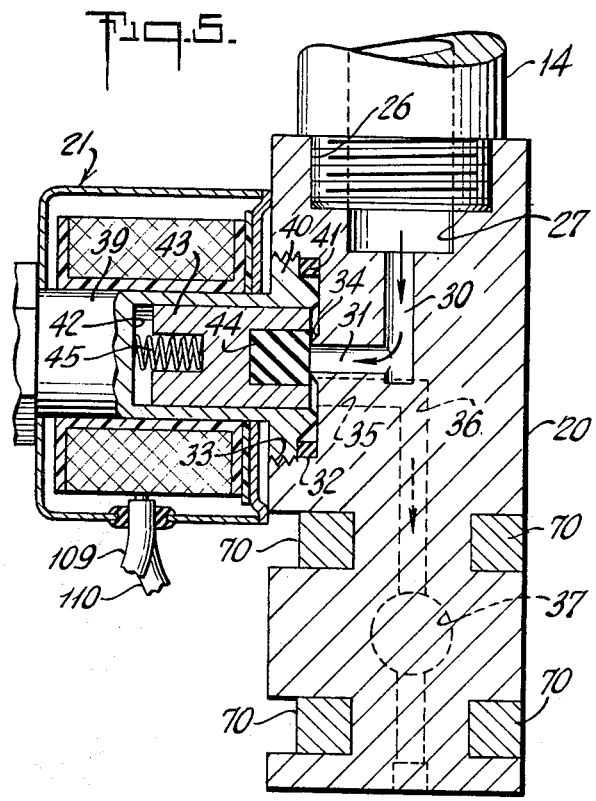

United States Patent Office 3,510,901
Patented May 12, 1970

3,510,901
LIQUID TREATING MEANS FOR IMAGE CARRYING FILM ON PROJECTION APPARATUS
Richard Sassenberg, 450 Weaver St.,
Larchmont, N.Y. 10538
Filed May 28, 1968, Ser. No. 740,394
Int. Cl. G03d 5/06
U.S. Cl. 15—100                              11 Claims

ABSTRACT OF THE DISCLOSURE

Liquid supplying and applicating apparatus for coating a film just prior to projection, said supplying apparatus functioning to maintain a small supply of liquid to said applicator at all times and increasing the supply of liquid when said projection apparatus is operated and said applicator including means for holding resilient pads in contact with each side of the film and means for distributing the liquid uniformly to each of the pads.

---

This invention relates to liquid treating means for image carrying film just prior to projection and more specifically to a novel and improved liquid supply and applicator for uniformly coating both sides of a film such as motion picture film to enable the projection of clearer and brighter images.

In normal projection and handling of film such as motion picture film or the like, dust and other foreign matter accumulates on the film itself as well as in the projection apparatus. As a result, the film is often marred or scratched and these defects are readily apparent on the projected image. Apparatus for applying a liquid such as perchlorethylene has been found to be advantageous not only for removing dirt and foreign matter from the film but also for minimizing if not entirely removing scratches from the projected images. Prior apparatus for coating film is disclosed in U.S. Pats. to Richard Sassenberg Nos. 2,987,955, and 2,988,043, and this invention concerns improved apparatus for supplying the coating liquid to an applicator and an improved applicator including liquid distribution means for maintaining a substantially uniform liquid supply to absorbent pads for simultaneously coating both sides of the film to be projected.

Another object of the invention resides in the provision of a novel and improved liquid supply system which enables the supply of small quantities of liquid to the liquid applicator to maintain the absorbent pads in a moist condition during periods when the projector is not operated and for providing an increased liquid supply required to coat the film during operation of the projector.

Another object of the invention resides in novel and improved automatic liquid supplying means which enables the supply of small quantities of liquid to absorbent liquid applicators while the film projector is not operating and which automatically increases the flow of liquid when the projector is operated. These ends are attained through a novel and improved arrangement of elements characterized by their simplicity and ease of operation and maintenance.

Still another object of the invention resides in the provision of a novel and improved liquid applicator for coating film with a liquid during the course of projection and embodying improved means for distributing the liquid to a pair of opposing absorbent pads to maintain them at the proper degree of saturation for coating a film to be projected.

Another object of the invention resides in a novel and improved applicator for coating film with a liquid which embodies improved means for holding the absorbent pads in contact with the film and which facilitates release of the applicator should any difficulty arise during projection of the film.

A still further object of the invention resides in the provision of an improved applicator construction which enables complete removal of the absorbent pads and the pad holders from the applicator for cleaning of the applicator and replacement of the applicating pads as well as a distributing pad for distributing the liquid uniformly to the applicator pads.

A still further object of the invention resides in the provision of a novel and improved liquid applicator for coating film which is characterized by its simplicity, ease of operation and ease of disassembly for maintenance and repair.

The above and other objects of the invention will become more apparent from the following description and accompanying drawings forming part of this application.

In the drawings:

FIG. 1 is a front elevational view of an improved liquid supply and applicating means in accordance with the invention;

FIG. 2 is a side elevational view of the apparatus illustrated in FIG. 1;

FIG. 3 is a cross-sectional view of FIG. 1 taken along the line 3—3 thereof;

FIG. 4 is a cross-sectional view of FIG. 3 taken along the line 4—4 thereof;

FIG. 5 is a cross-sectional view of FIG. 1 taken along the line 5—5 thereof;

FIG. 6 is a cross-sectional view of FIG. 1 taken along the line 6—6 thereof;

FIG. 7 is a cross-sectional view of FIG. 6 taken along the line 7—7 thereof;

FIG. 8 is an exploded perspective view of the applicator shown in FIGS. 6 and 7; and FIG. 9 is a circuit for automatically operating the liquid supply means when the film projector is operated.

Referring now to the drawings and more specifically to FIGS. 1 and 2, the liquid supplying apparatus for coating a film is generally denoted by the numeral 10 while the applicator for applying the liquid directly to the film is generally denoted by the numeral 11. The liquid supply means 10 includes a liquid reservoir 12 having a filler opening 13 in the top side thereof. The reservoir 12 is coupled by a conduit 14 to the valving assembly generally denoted by the numeral 15 and shown in detail in FIGS. 3 through 5. The valving assembly is coupled by a pair of tubes 16 and 17 to a Y-connector 18, and the output of the Y-connector is coupled by a tube 19 to the applicator 11.

The valving assembly 15 comprises a central element or distributor 20 connected with the reservoir 12 and feeding the liquid into two separate paths one of which is controlled by an electrically operated solenoid valve 21. Adjoining the central element 20 are spacing elements 22 and 23. Valving structures 24 and 25 are secured to the outer surfaces of the elements 22 and 23 and control the supply of liquid to the tubes 16 and 17, respectively.

More specifically, the central element 20 is in the shape of a rectangular block having a threaded recess 26 for threadably receiving and supporting the pipe 14 carrying the reservoir 12 on the upper end thereof. A second recess 27 is disposed concentrically of the threaded recess 26 and is formed in the bottom wall thereof. A first passage 28 extends from the bottom wall of recess 27 downwardly to intersect a relatively large laterally disposed opening 29. The passage 28 as will be shown supplies liquid to the constant flow valve 25 which is adjusted in normal operation to maintain a small supply of liquid to the applicator 11 at all times. The central element 20 further includes a central passage 30 which extends downwardly and intersects a horizontal opening 31 extending inwardly from the center of a recess 32 having a threaded portion 33 for threadably receiving the electrically operated control valve 21. The passage 31 has an annular shoulder 34, as viewed more clearly in FIG. 5, forming a valve seat which is closed and opened by operation of the valve 21. A liquid outlet passage 35 extends inwardly from the base of the recess 32 and intersects downwardly extending passage 36, the latter intersecting with a relatively large horizontal opening 37. To facilitate formation of the passage 36, a hole is drilled upwardly from the bottom of the element 20, and the bottom section 36' of the passage 36 is then closed by convenient means such as a threaded plug 38.

The electrically operated control 21 is of conventional construction and includes a central cylindrical support 39 having an enlarged threaded portion 40 engaging the threads 33 in the recess 32 and sealed therein by means of a gasket 41. The central support 39 has a recess 42 therein for slidably receiving a magnetic plunger 43 having an annular piece of resilient material 44 in the outer end thereof. A spring 45 urges the plunger 43 outwardly to force the resilient material 44 against the valve seat 34 to close the passage 30. When the control 21 is energized, the plunger 43 is withdrawn and fluid can pass freely through the passages 30 and 31 into the recess 32 and then outwardly through the passage 36.

Referring now to FIG. 4, the spacers 22 and 23 principally afford separation of the valving structures from the central element 20 to facilitate operation of the valves. Each of the spacers 22 and 23 is further provided with an annular recess 47 for receipt of O-rings 48 to provide a liquid seal.

The valving structures 24 and 25 are identical and therefore only the structure 25 will be described. It includes a housing 49 of generally rectangular configuration having a horizontal opening 50 extending therethrough. One end of the opening 50 which connects with the opening 46 in the adjoining spacer has a recess 51 for receipt of an O-ring 52 to provide a seal between the housing 49 and the adjoining spacer 22 or 23 as the case may be. The outer end of the opening 50 threadably receives a valve 53 for bleeding air from the system.

The upper side of the housing 49 includes an upwardly extending cylindrical portion 54 preferably formed integrally with the housing 49. An opening 55 extends downwardly through the cylindrical portion 54 and housing 49 and communicates with the transverse opening 50. The lower portion of the opening 55 is threaded to receive the threaded valve stem 56 carrying a needle valve 57 on the lower end thereof. A cap nut 58 threadably engages the cylindrical portion 54 and functions together with a gasket 59 to seal the valve stem. The upper end of the valve stem includes an operating handle 60 and a spring 61 is interposed between the cap nut 58 and the handle 60 to hold the valve stem in an adjusted position. A valve seat 62 is formed in the lower side of the passage 50 and cooperates with the needle valve 57 to control the flow of fluid between the valve 57 and its cooperating seat 62. An annular piece of filtering material 63 of felt or other suitable material surrounds the lower end of the needle valve 57 and is held in position by a spring 64 disposed between the filter 63 and the bottom end of the valve stem 56. The valve seat 62 communicates with a vertically disposed passage 65 which extends through a depending cylindrical portion 66, the latter terminating within a viewing opening 67 as may be observed more clearly in FIG. 1. The viewing opening 67 is formed in the bottom portion of the housing 49 and below the viewing opening there is a liquid receiver 68 connected by suitable fittings 69 to a tube 16 or 17 as the case may be. With this arrangement, the needle valve 57 can be adjusted to cause droplets of liquid to pass downwardly into the receiver 68 and the rate of flow can be adjusted by timing the rate at which the droplets fall into the receiver.

The valving assembly 15 comprises the elements 20, 22, 23, 24, and 25 which are held together by four bars 70 as viewed more clearly in FIGS. 1 and 5. The bars 70 lie in channels formed in each of the elements and are held in place by a pair of links 71 on each end of the valving assembly and screws 72 which extend through the links and threadably engage cooperating openings in the ends of the bars 70.

With the invention thus far described, fluid from the reservoir 12 flows downwardly through the pipe 14 and into the central element 20. The passage 28 provides a constant flow of liquid to the valve structure 25 and by adjustment of the needle valve in that structure, liquid may be fed through the tube 17 and downwardly into the applicator 11 at a rate sufficient to keep the applicator pads moist when the projection apparatus is not operating. At this time the control valve 21 is closed and interrupts the flow of fluid through the valve structure 24 and into the tube 16. When the projector is operated, the control 21 is simultaneously operated to open the valve seat 34 and permit fluid to flow into the valve structure 24. The valve in the structure 24 is adjusted to provide a rate of flow sufficient to provide a liquid coating on the film during operation of the projector. It is of course evident that when operation of the projector is to be terminated for an extended period of time, both needle valves in the valve structures 24 and 25 can be closed to terminate all flow of liquid. The valves 53 on the ends of the valving assembly 15 are bleeder valves to remove air from the system in preparation for operation of the liquid applicating apparatus.

The liquid applicator 11 is positioned on the projector so that the motion picture or other film to be displayed will pass through the applicator. The path of the motion picture film in the instant embodiment of the invention is shown by the broken line 73 in FIG. 1.

Referring more specifically to FIGS. 6 through 8, the applicator 11 includes a generally vertically disposed plate 74, an upper outwardly extending support 75 and a lower outwardly extending support 76, the latter being secured to the plate by a hinge 77. The support 75 has a dove-tailed slot 75' on the lower side thereof while the support 76 has a dove-tailed slot 76' on the upper side thereof. The plate 74 further includes an elongated recess 78 centered generally between the upper and lower supports 75 and 76 and includes a passage 79 extending downwardly from the top edge and terminating in the recess 78. A nipple 80 is threadably inserted in the upper end of the passage 79 so that the applicator can be coupled with the tube 19 as shown in FIG. 1. The plate 74 is also provided with a transverse channel 81 along the bottom edge thereof and a drain 82 threadably carried in the bottom wall of the plate 74 and communicating with the channel 81 to remove any excess fluid that may be fed to the applicator.

The absorbent pads 83 are supported by pad holders 84 and 85. The upper pad holder 84 has an undercut ridge portion 86 which slidably engages the dove-tailed groove 75. A spring-loaded ball structure generally denoted by the numeral 87 is threaded in a cooperating opening in the upper support 75 to frictionally engage the top of the pad holder 84 to hold it in position. The underside of the pad holder 84 has an elongated pad receiving recess 88 which has a depth slightly less than the thickness of the pad 83 as will be observed more clearly in FIG. 7. The front edge 89 of the upper pad holder extends downwardly below the side walls 90 and terminates in a plane slightly above the plane of the surface of the associated pad 83. The front edge of the pad holder 84 includes an arcuate groove 91 which forms part of the fastening means for holding the two pad holders in the position shown in FIGS. 6 and 7. The rear portion or surface 92 of the upper pad holder has a cut-out portion 93 which intersects the recess 88. The width of the cut-out portion 93 corresponds approximately to the width of the recess 78 in the plate 74 and is preferably slightly greater than the width of the recess 78.

The lower pad holder 85 is formed in a similar manner to the upper pad holder 84 in that it includes an elongated pad receiving recess 94, a raised front portion 95 and a rear cut-out 96. The bottom side of the lower pad holder includes an undercut ridge 97 for slidably engaging the dove-tailed slot 76' and the lower support 76 has a spring-loaded ball structure 98 for frictionally holding the lower pad holder 85 on the support 76. The front end of the pad holder 85 includes a rotatable knob 99 held in position by a screw 100. The inner edge of the knob includes an arcuate flange 101 and the front surface 102 of the pad holder 85 has an arcuate groove to accommodate the flange 101 as the knob is rotated. The flange 101 is of relatively short arcuate length so that it can be rotated into and out of engagement with the arcuate groove 91 in the upper pad holder 84.

In preparing the applicator for operation, pads 83 are inserted in each of the pad holders 84 and 85, and a pad 78' is inserted into the recess 78. The pad 78' has a thickness substantially greater than the depth of the recess 78 so that it will project outwardly from the surface of the plate 74. When the pad holders 84 and 85 are inserted into the supports 75 and 76 as shown for instance in FIG. 6, the applicator pads 83 tightly engage the pad 78'. It is also desirable that the thickness of the pads 83 be great enough so that the pads 83 will slightly compress when the applicator is in the closed position as shown in FIG. 6. With this arrangement as fluid is fed from the supply through the tube 80 and into the passage 79, it will saturate the pad 78' and by reason of the physical contact of this pad with the applicator pads 83, the applicator pads 83 will be saturated with liquid. Excess liquid will flow down over the surface of the plate 74 into the channel 81 and discharged through the drain 82. A suitable film guiding roller 11' is positioned adjoining one side of the applicator to guide the film 73 to be treated by the pads 83. To insert the film in the applicator, the knob 99 is rotated so that the bottom pad holder and its associated support 76 can be moved to the downward position as shown in dotted outline in FIG. 6. After the film has been inserted, the pad holder is raised and locked into position as previously described. By reason of the novel and improved latching arrangement, the operator of a motion picture projector can quickly disengage the applicator should any difficulty occur and if necessary the pad holders 84 and 85 can be completely removed. Furthermore, by reason of the novel and improved construction in accordance with the invention, the applicating elements can be easily removed for cleaning and replacement of the applicator and fluid distributor pads.

FIG. 9 is a circuit diagram showing the interconnection of the electrically controlled valve 21 with the motion picture projector. Electrical energy for operation of the projector is fed to the leads 103 and 104 with the lead 103 having a master switch 105 for control of energy to the leads 106 and 107 for energizing the projector motor 108. The electrically controlled valve 21 is connected by leads 109 and 110 through leads 111 and 112 which connect with the supply leads 106 and 107. A protective fuse 113 is connected in series with the lead 111 and a pilot light 114 is connected across the leads 111 and 112. With this arrangement, when the switch 105 is closed to operate the projector motor, the solenoid valve 21 is automatically opened to increase the flow of liquid to the applicator 11.

While only one embodiment of the invention has been illustrated and described, it is apparent that alterations, modifications and changes may be made without departing from the true scope and spirit thereof.

What is claimed is:

1. Film treating means for applying a liquid to image-carrying film prior to projection comprising a pair of pad holders each having a pad receiving recess therein, an absorbent pad in each recess, said pads each having a thickness greater than the depth of its associated recess, a support for said pad holders, said pad holders being movable to and from a position wherein said pads are in contacting relationship to facilitate insertion of the film to be treated therebetween, means on one of said pad holders for releasably holding said pad holders in said position, and fluid inlet and distribution means carried by said support for applying fluid to the pads of said pad holders only when said holders are in position on said support.

2. Film treating means according to claim 1 wherein said means on said pad holders for releasably holding said pad holders in said position includes a pair of members displaceable one relative to the other and having surfaces movable into a substantially co-planar adjoining position, locking means for holding said members in said position comprising a knob rotatably mounted on the surface of one of said members, arcuate means on the other of said surfaces, and cooperating arcuate means carried by said knob and movable into engagement with the first said arcuate means by rotation of said knob to hold said members in said position, at least one of said arcuate means comprising a curved ridge of substantial angular length said ridge being movable into and out of engagement with the other of said arcuate means.

3. Film treating means for applying a liquid to image-carrying film prior to projection comprising a pair of pad holders each having a pad receiving recess therein, an absorbent pad in each recess, said pads each having a thickness greater than the depth of its associated recess, means for supporting said pad holders for movement to and from a position wherein said pads are in contacting relationship to facilitate insertion of the film to be treated therebetween, means on one of said pad holders for releasably holding said pad holders in said position, and fluid inlet and distribution means within said support, said distribution means contacting both of said pads when in said one position for supplying liquid thereto, said supporting means including a plate and means for securing each of said pad holders to said plate with one edge in abutting relationship therewith, said one edge of each of said pad holders having a cut-out portion intersecting said recess to expose the adjoining edge of said pad and said distributing means including a fluid receiving recess bridging said exposed pad edges and a fluid distribution pad in said recess having a width not exceeding the width of said cut-outs whereby the exposed edges of the first said pads will firmly contact said distribution pad when said pad holders are in said one position.

4. Film treating apparatus according to claim 3 wherein said releasable holding means includes an arcuate groove on the face of each of said pad holders opposing said one edge and one of said pad holders includes a rotatable knob having an arcuate flange extending into the arcuate groove on said one pad holder and movable into and out of the arcuate groove on the other pad holder.

5. Film treating apparatus according to claim 3 wherein said means for securing said pad holders to said plate includes a pair of members secured to and extending outwardly from said plate in spaced parallel relationship, one of said members being hinged for movement toward and away from the other member, and means on the facing sides of said members slidably receiving and retaining said pad holders.

6. Film treating apparatus according to claim 5 wherein said releasable holding means includes an arcuate groove on the face of each of said pad holders opposing said one edge and one of said pad holders includes a rotatable knob having an arcuate flange extending into the arcuate groove on said one pad holder and movable into and out of the arcuate groove on the other pad holder.

7. Film treating means for applying a liquid to image-carrying film prior to projection comprising a pair of pad holders each having a pad receiving recess therein, an absorbent pad in each recess, said pads each having a thickness greater than the depth of its associated recess, means for supporting said pad holders for movement to and from a position wherein said pads are in contacting relationship to facilitate insertion of the film to be treated therebetween, means on one of said pad holders for releasably holding said pad holders in said position, and fluid inlet and distribution means within said support, said distribution means contacting both of said pads when in said one position for supplying liquid thereto, said apparatus further including a liquid reservoir and a valve assembly connected to said reservoir, said valve assembly including a pair of vernier valves, means for feeding liquid directly to one of said vernier valves, means including an electrically operated valve for feeding liquid to the other of said vernier valves and tubular means coupling each of said vernier valves to said fluid inlet.

8. Film treating apparatus according to claim 7 wherein said valve assembly includes a central element connected to said reservoir and having two separate fluid passageways formed therein and an electrically operated valve controlling one of said passageways, and said vernier valves are carried by individual housings coupled to said central element, the last said housings including bleeder valves for bleeding air from the structure.

9. Film treating means according to claim 8 wherein said supporting means includes a plate and means for securing each of said pad holders to said plate with one edge in abutting relationship therewith, said one edge of each of said pad holders having a cut-out portion intersecting said recess to expose the adjoining edge of said pad and said distributing means including a fluid receiving recess bridging said exposed pad edges and a fluid distribution pad in said recess having a width not exceeding the width of said cut-outs whereby the exposed edges of the first said pads will firmly contact said distribution pad when said pad holders are in said one position.

10. Film treating apparatus according to claim 9 wherein said means for securing said pad holders to said plate includes a pair of members secured to and extending outwardly from said plate in spaced parallel relationship, one of said members being hinged for movement toward and away from the other member, and means on the facing sides of said members slidably receiving and retaining said pad holders.

11. Film treating apparatus according to claim 9 wherein said releasable holding means includes an arcuate groove on the face of each of said pad holders opposing said one edge and one of said pad holders includes a rotatable knob having an arcuate flange extending into the arcuate groove on said one pad holder and movable into and out of the arcuate groove on the other pad holder.

References Cited

UNITED STATES PATENTS

| | | | |
|---|---|---|---|
| 977,466 | 12/1910 | Mortimer | 15—100 |
| 1,208,664 | 12/1916 | Russak et al. | 15—100 |
| 1,273,928 | 7/1918 | Rosenfeld | 15—100 |
| 1,927,284 | 9/1933 | Howell | 15—100 |
| 2,987,955 | 6/1961 | Sassenberg | 118—267 |

WALTER A. SCHEEL, Primary Examiner

R. I. SMITH, Assistant Examiner

U.S. Cl. X.R.

118—266; 352—130